United States Patent
Tarle

(10) Patent No.: US 7,324,838 B2
(45) Date of Patent: Jan. 29, 2008

(54) SYSTEMS AND METHODS FOR MODIFYING THE GRAPHICS OUTPUT OF AN APPLICATION

(75) Inventor: Martin Anthony Tarle, Toronto (CA)

(73) Assignee: Tira Wireless Inc., Toronto (CA)

( * ) Notice: Subject to any disclaimer, the term of this patent is extended or adjusted under 35 U.S.C. 154(b) by 557 days.

(21) Appl. No.: 10/998,675

(22) Filed: Nov. 30, 2004

(65) Prior Publication Data

US 2006/0114250 A1 Jun. 1, 2006

(51) Int. Cl.
*H04B 1/38* (2006.01)
(52) U.S. Cl. .................. 455/566; 455/418; 455/422.1; 455/425; 715/747; 715/744; 715/746
(58) Field of Classification Search ............... 455/566, 455/418, 422.1, 425; 715/744, 746, 747
See application file for complete search history.

(56) References Cited

U.S. PATENT DOCUMENTS

| 5,608,899 | A | 3/1997 | Li et al. | |
|---|---|---|---|---|
| 2002/0112225 | A1 | 8/2002 | Charisisu et al. | |
| 2003/0120675 | A1 | 6/2003 | Stauber et al. | |
| 2003/0140120 | A1* | 7/2003 | Hartman | 709/219 |
| 2003/0144996 | A1* | 7/2003 | Moore, Jr. | 707/3 |
| 2003/0182333 | A1* | 9/2003 | Good et al. | 708/131 |
| 2005/0172236 | A1* | 8/2005 | Cragun et al. | 715/744 |
| 2005/0172237 | A1* | 8/2005 | Cragun et al. | 715/744 |
| 2006/0041906 | A1* | 2/2006 | Vermola | 725/39 |

FOREIGN PATENT DOCUMENTS

| EP | 635781 | 1/1995 |
|---|---|---|
| EP | 856170 | 4/1997 |

OTHER PUBLICATIONS

Video Studio—Working With Resource Files, Microsoft Corporation, 2005.
Video Studio—Image Editor, Microsoft Corporation, 2005.
Video Studio—Resource Editors, Microsoft Corporation, 2005.

* cited by examiner

*Primary Examiner*—Joseph Feild
*Assistant Examiner*—Huy D Nguyen
(74) *Attorney, Agent, or Firm*—Bereskin & Parr

(57) ABSTRACT

A method of modifying the graphics output of an application written for a reference mobile device in order to optimize the graphics output for a target mobile device is disclosed. The target mobile device has a display having different characteristics from the reference mobile device. The method includes the following steps:
  a) loading the application on the target mobile device;
  b) executing a portion of the application on the target mobile device, such that the graphics output of the application is displayed on the display of the target mobile device;
  c) storing an instruction from the application which produces the graphics output; and
  d) changing the instruction by user input from the target mobile device.

14 Claims, 5 Drawing Sheets

SYSTEMS AND METHODS FOR MODIFYING THE GRAPHICS OUTPUT OF AN APPLICATION

FIELD OF THE INVENTION

The invention relates to software application development. In particular, the invention relates to systems and methods for modifying the graphics output of an application.

BACKGROUND OF THE INVENTION

Software development of applications, such as games, which have a graphics component can be a time consuming and laborious task. One such problem is optimizing the graphics output of the application for the particular characteristics of a computing device display. This problem is particularly significant in the field of mobile devices, such as wireless phones, pagers, and personal digital assistants (PDAs). The proliferation of mobile devices and the lack of standardization has created an enormous variety of devices with different display characteristics.

Typically, a mobile device possesses a display screen, such as a liquid crystal display (LCD). Game applications are typically developed for a particular mobile device (referred to herein as a "reference mobile device") having a display screen with a particular set of characteristics, such as screen size, color, and resolution. For this reason, the graphics of a game application often do not display as intended by the developer on a device with a display having a different set of characteristics even if the two devices support the same platform, such as the Java 2 Micro Edition (J2ME). In other words, even if the game application runs on a different mobile device, it does not appear on the screen as it is intended to appear, due to the differing characteristics of the display screens of the two devices.

Several methods to modify an application so that it runs on a mobile device having different display characteristics (referred to herein as a "target mobile device") are known.

One such method is referred to as the "porting approach". In this approach, the software developer manually modifies the source code of the application and then recompiles the source code using a compiler developed for the target mobile device. The main disadvantage of this approach is it is very labor-intensive. In addition, this approach requires the developer to maintain and manage multiple versions of the source code (for each target mobile device) for a single game application.

Another known method to modify an application is referred to as the "on-line interpretation" approach. In this method, a software module called an "interpreter" interprets instructions from an executable version of the application program written to run on the reference mobile device. The interpreter chooses the appropriate instructions or routines required for the application to execute the same functions in the target mobile device. The interpreter essentially runs as an emulator, which responds to an executable file of the application which runs on the reference mobile device, and in turn, creates a converted executable file which runs on the target mobile device.

A disadvantage of the on-line interpretation method is that the interpreter must be able to be loaded and executed on the target mobile device. While this is possible on some systems like desktop personal computer systems, it is not feasible for mobile devices due to size and performance limitations.

Accordingly, there is a need for systems and methods for facilitating the modification of the graphics output of an application for different mobile devices.

SUMMARY OF THE INVENTION

According to a first aspect of the invention, a method is provided for modifying an application developed for a reference mobile device to optimize the graphics output of the application for a target mobile device. The method comprises:
 a) loading the application on the target mobile device;
 b) executing at least a portion of the application on the target mobile device, wherein the graphics output of the portion of the application is displayed on the display of the target mobile device;
 c) storing at least one instruction from the application, wherein the at least one instruction is adapted to produce the graphics output; and
 d) changing the at least one instruction by user input from the target mobile device.

According to a second aspect of the invention, a system is provided for modifying an application developed for a reference mobile device to optimize the graphics output of the application for a target mobile device. The system comprises:
 a) a first software code adapted for insertion into the application, wherein the first software code is adapted to store at least one instruction from the application, wherein the at least one instruction is adapted to produce the graphics output;
 b) a data structure created by the first software code, wherein the data structure is adapted to store the at least one instruction; and
 c) a second software code adapted for insertion into the application, the second software code adapted to create a GUI on the display of the target mobile device, wherein the GUI is adapted to change the at least one instruction by input from the target mobile device and display the change to the graphics output on the display screen of the target mobile device.

DETAILED DESCRIPTION OF THE PREFERRED EMBODIMENT OF THE INVENTION

Figure 1:
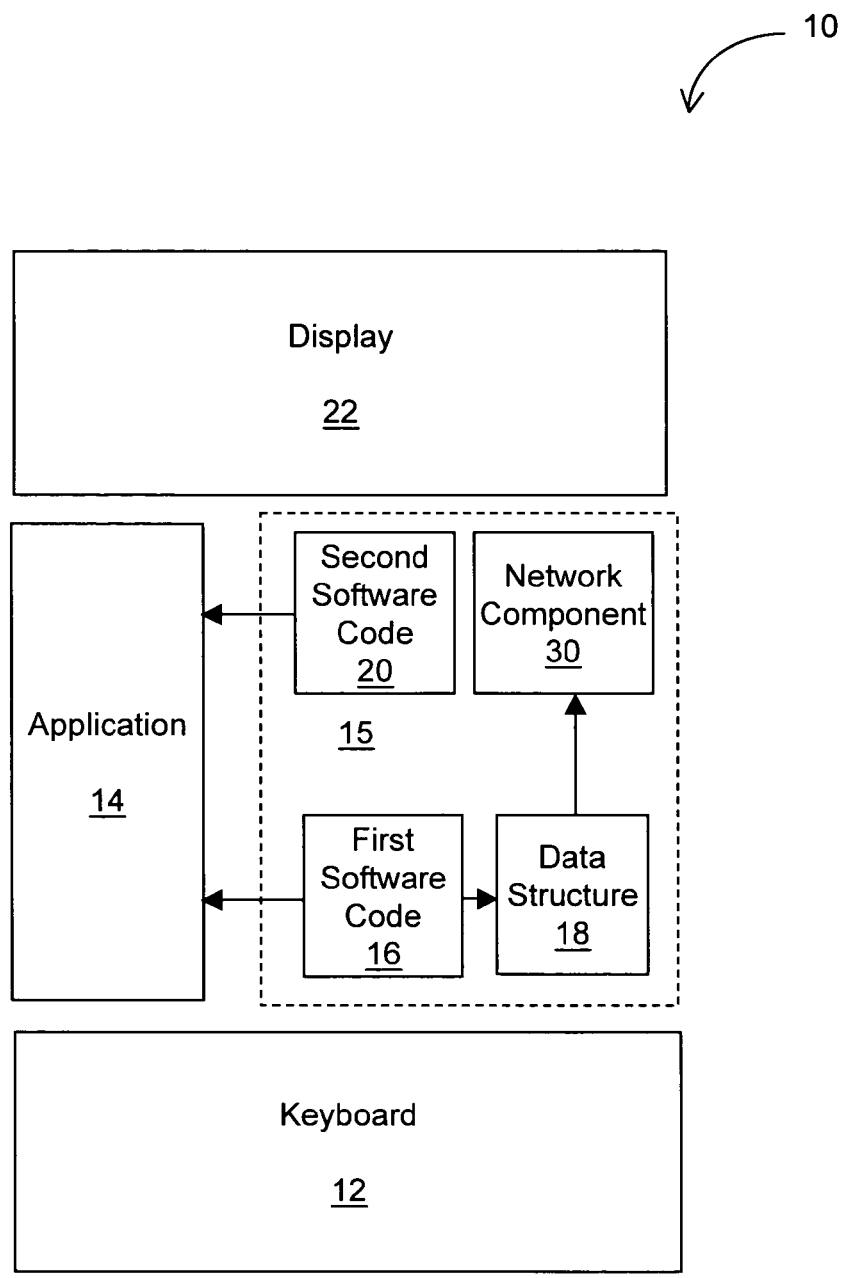
FIG. 1 is a block diagram showing a preferred embodiment of the present invention.

FIG. 1 shows a computing device, such as a target mobile device 10. As used herein, "mobile device" means any portable computing device with processing and display functionality, including without limitation a cell phone, personal digital assistant (PDA), a personal email device, or a handheld electronic gaming device. For the purpose of this patent application "mobile device" also means an emulator for any of the foregoing devices running on a computer.

The target mobile device 10 includes an input device 12, such as, for example, a keyboard. It will be understood by those skilled in the art that any other suitable input device, such as a joy stick, touch screen, etc. may be used.

Continuing to refer to FIG. 1, an application 14 is loaded on the target mobile device 10. The application 14 includes software components which instruct the processor of the target mobile device 10 to produce a graphics output to a display. The application 14 is developed for a particular mobile device referred to herein as a "reference mobile device". Preferably, the application 14 is a Java application, and more preferably, the application is a Java 2 Platform Micro Edition (J2ME) application.

A "target mobile device" is any mobile device having display characteristics which differ from the display characteristics of the reference mobile device. Such characteristics may include without limitation screen size, resolution, or number of available colors.

In one example, the reference mobile device may be a Nokia™ 3650 cellular phone, the target mobile device 10 may be a Motorola™ V300 cellular phone, and the application 14 may be NHL™ Powershot Hockey™.

A system 15 according to a preferred embodiment of the present invention includes a first software code 16 which is configured for insertion into the application 14. As used herein, "insertion" means modification of the source code of the application 14 by code contained in the first software code 16. For example, "insertion" may include without limitation the following:

1. Modify a method call, as follows:
   a. insert code before the method call;
   b. insert code after the method call;
   c. replace the method call (includes removing the entire method call);
   d. modify the parameters of the method call; and
   e. modify the return value of the method call.

2. Modify a method/constructor, as follows:
   a. insert code at the beginning of the method/constructor;
   b. insert code at the end of the method/constructor;
   c. modify the method/constructor body;
   d. add a try/catch block of the entire method/constructor body; and
   e. rename the method (not applicable to constructor).

3. Modify a "new" expression, as follows:
   a. insert code before the "new" call;
   b. insert code after the "new" call;
   c. replace the "new" call;
   d. modify the parameters of the "new" call; and
   e. modify the return value of the "new" call.

4. Modify an exception handler, as follows:
   a. insert before an exception handler.

5. Modify a field access, as follows:
   a. insert code before the field access;
   b. insert code after the field access;
   c. replace the field access (includes removing the entire field access); and
   d. modify the return value of the field access.

In the preferred embodiment of the present invention where the application 14 is a J2ME application, the first software code 16 includes a first Java class referred to in the example described below as a "GraphicsLogger" class. The GraphicsLogger class includes a number of methods which correspond to particular methods called by the application 14. Specifically, the methods of the GraphicsLogger class correspond to those methods of the application 14, which produce the graphics output of the application 14. For example, methods of the GraphicsLogger class may correspond to methods in the Graphics interface of the J2ME platform which are called from the application 14, such as methods called from the Canvas class. Set out below is a simple example of a portion of paint method from the application 14, which draws a background, score, and player image for a game.

```
protected void paint(Graphics graphics)
{
    // draw the background
    graphics.setColor(0, 0, 255);
    graphics.fillRect(0, 0, getWidth( ), getHeight( ));
    // draw the score string
    graphics.drawString(strScore, 0, 5,
Graphics.TOP|Graphics.LEFT);
    // draw the player image
    graphics.drawImage(imgPlayer, playerX, playerY,
Graphics.TOP|Graphics.LEFT);
}
```

As can be seen above, the methods of the Graphics interface may be implemented by the paint methods of the Canvas class of the application 14.

As discussed above, the GraphicsLogger class of the first software code 16 includes methods which correspond to those methods of the application 14 which produce graphics output to the display 22 of the mobile device 10, such as for example the graphics interface methods. The first software code 16 is inserted into the application 14 in any suitable fashion known in the art, such as using a freeware bytecode modifier tool distributed under the name Javassist, which is available at http://www.csg.is.titech.ac.jp/~chiba/javassist/.

Set out below is the paint method example shown above after insertion of the GraphicsLogger class of the first software code 16. In the example below, the first software code includes a Java class named GraphicsLogger.

```
protected void paint(Graphics graphics)
{
    // draw the background
    GraphicsLogger.callId = 1;
    GraphicsLogger.setColor(graphics, 0, 0, 255);
    GraphicsLogger.callId = 2;
    GraphicsLogger.fillRect(graphics, 0, 0, getWidth( ),
getHeight( ));
    // draw the score string
    GraphicsLogger.callId = 3;
    GraphicsLogger.drawString(graphics, strScore, 0, 5,
Graphics.TOP|Graphics.LEFT);
    // draw the player image
    GraphicsLogger.callId = 4;
    GraphicsLogger.drawImage(graphics, imgPlayer, playerX,
playerY,
Graphics.TOP|Graphics.LEFT);
}
```

As shown above, all of the calls to Graphics are replaced by calls to methods of the GraphicsLogger class. Each such method of the GraphicsLogger class forwards the call to the graphics object passed as its first parameter, and stores the remaining parameters in a data structure 18. A unique identifier is also assigned to each method call stored. An example of the data structure 18 is set out below.

```
public static void drawImage(Graphics graphics, Image image,
    int x, int y, int anchor)
{
    graphics.drawImage(image, x, y, anchor);
    calls.add(DRAW_IMAGE, image, x, y, anchor, callId);
}
```

In the above, example the data structure 18 is a Java class named Calls.

Continuing to refer to FIG. 1, a second software code 20 is inserted into the application in the same manner as described for the first software code. In the preferred embodiment of the present invention where the application 14 is a Java application, the second software code 20 includes a second Java class referred to for convenience herein as a "CanvasEditor class".

The CanvasEditor class includes code which overrides the paint method of the Canvas class in order to enable the application 14 to implement a graphical user interface (GUI) on the display 22 of the target mobile device 10. As used herein "GUI" means an interface which is capable of displaying at least the following on the display 22 of the target mobile device 10:

(i) graphics output of the application 14;

(ii) the source code instruction or instructions which produces the graphics output (e.g. method call and parameters); and (iii) changes to the source code instruction(s) made by user input on the input device 12, as well as the corresponding graphics output produced by the changes to the source code instruction(s).

Preferably, a J2ME software network component 30 is provided to transmit data (described in detail below) to a server via the Internet using the HTTP protocol. An example of the source code for the network component 30 is provided below.

```
public void sendChangesToServer(String serverURL, Vector calls)
{
    HttpConnection httpconnection;
    OutputStream outputstream;
    httpconnection = (HttpConnection)Connector.open(serverURL);
    httpconnection.setRequestMethod("POST");
    outputstream = httpconnection.openOutputStream( );
    for(int i=0; i < calls.size( ); i++) {
        GraphicsCall call = (GraphicsCall)calls.get(i);
        if(call.delta != null) {
            outputstream.writeInt(call.callID);
            outputstream.writeInt(call.delta.x);
            outputstream.writeInt(call.delta.y);
            outputstream.writeInt(call.delta.width);
            outputstream.writeInt(call.delta.height);
        }
    }
    outputstream.flush( );
    outputstream.close( );
}
```

The operation of the preferred embodiment of the present invention will now be described with reference to FIGS. 1 and 2.

Figure 2:
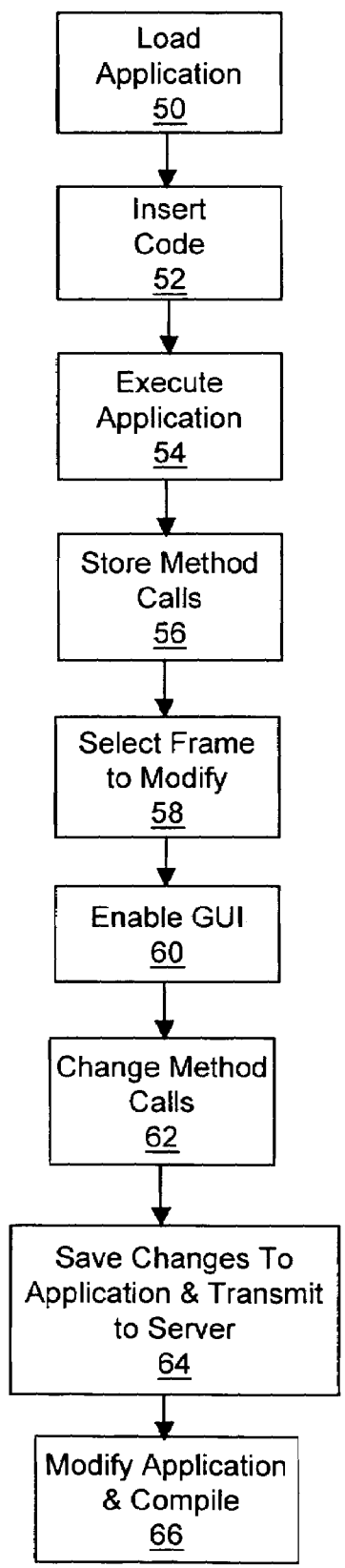
FIG. 2 is a flow diagram showing the operation of the preferred embodiment.

As best shown in FIG. 2, the operation of the preferred embodiment begins at step 50, where the application 14 is loaded on the target mobile device 10.

At step 52, the GraphicsLogger and CanvasEditor Class of the first and second software codes 16, 20, respectively, are inserted into the application 14, as discussed above.

At step 54, the application 14 is executed on the target mobile device 10 and the graphics output of the application 14 is displayed on the display 22 of the target mobile device 10.

The operation of the present invention then moves to step 56. While the application 14 is running, all of the method calls to the Graphics interface, their parameters, and a unique identifier of each method call are stored in the data structure 18, as discussed above. Additional code may be inserted at the beginning of the Paint method to clear the data structure 18 so that it always contains a record of the last frame drawn to the display 22 of the target mobile device 10.

The operation of the present invention then moves to step 58. When the graphics output of the application 14 reaches a frame the user desires to modify, the user presses a predetermined key on the keyboard 12, which causes the execution of the application to pause on the selected frame.

At step 60, the press of the predetermined key causes the second software code 20 to implement the GUI on the display 22 of the target mobile device 10, as described above. The GUI displays the logged graphics calls stored by GraphicsLogger 16 in the data structure 18 for the selected frame. The GUI permits the user to select a particular graphics call for the selected frame using the input device 12. When selected, a graphics object 80 (such as the "PowerShot" string) drawn by the selected graphics call is highlighted on the display 22 of the target mobile device 10, as best shown in FIG. 3A.

Figure 3B:
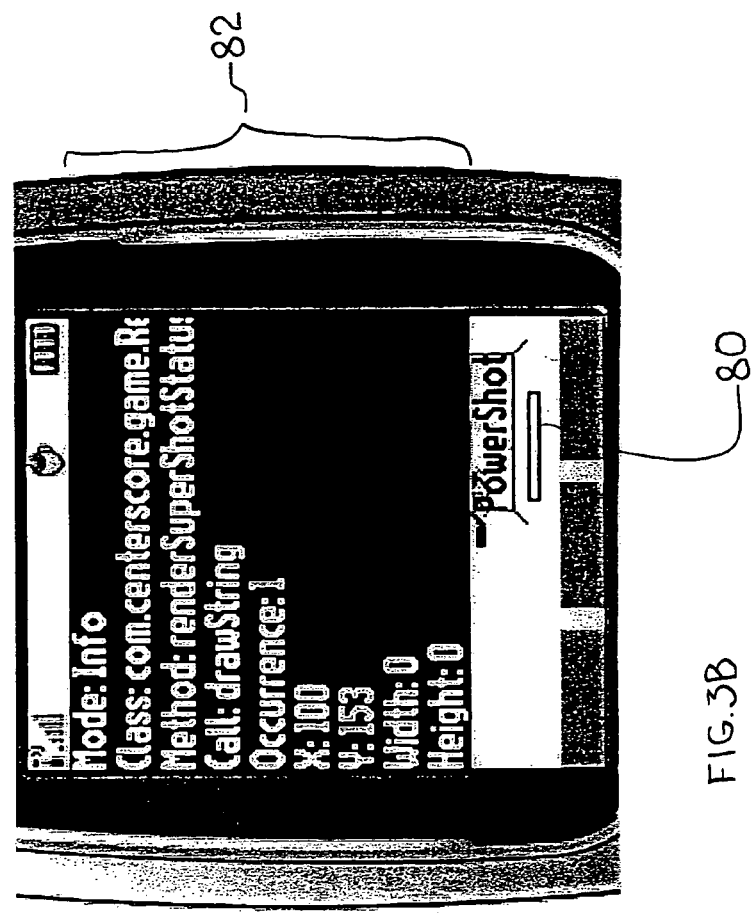
FIGS. 3A-3F are screen shots illustrating the operation of the preferred embodiment.
Figure 3A:
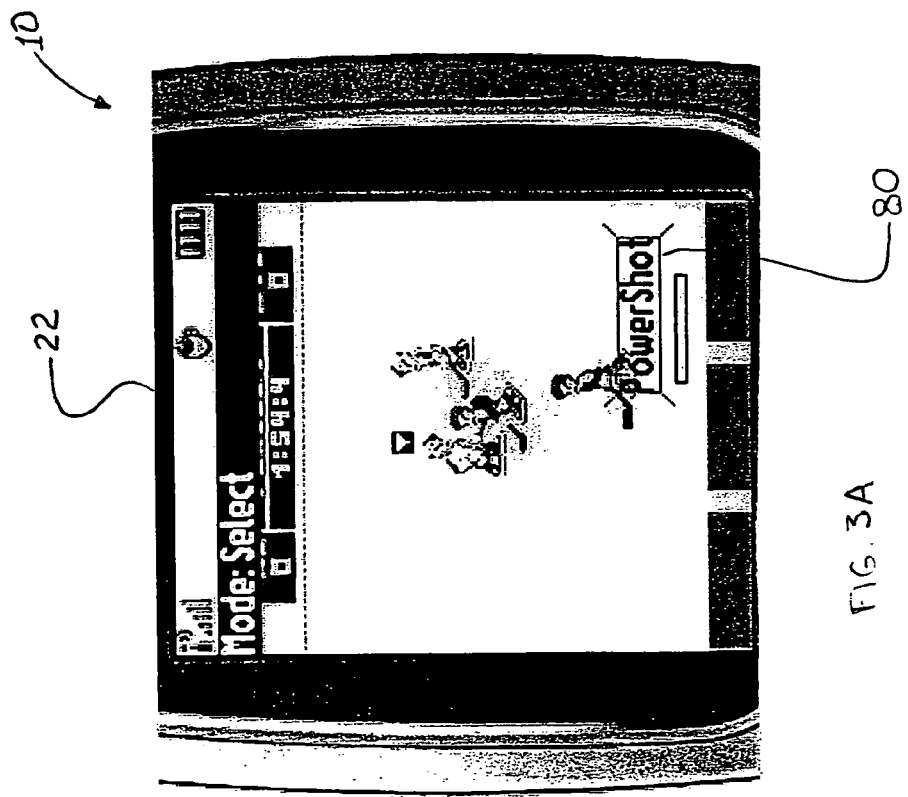

Referring to FIG. 3B, the GUI, may include an "Info" mode 82 which displays information about the graphics object 80. The information displayed may include the class of which the object is a member, its method, method call, and parameters.

Figure 3D:
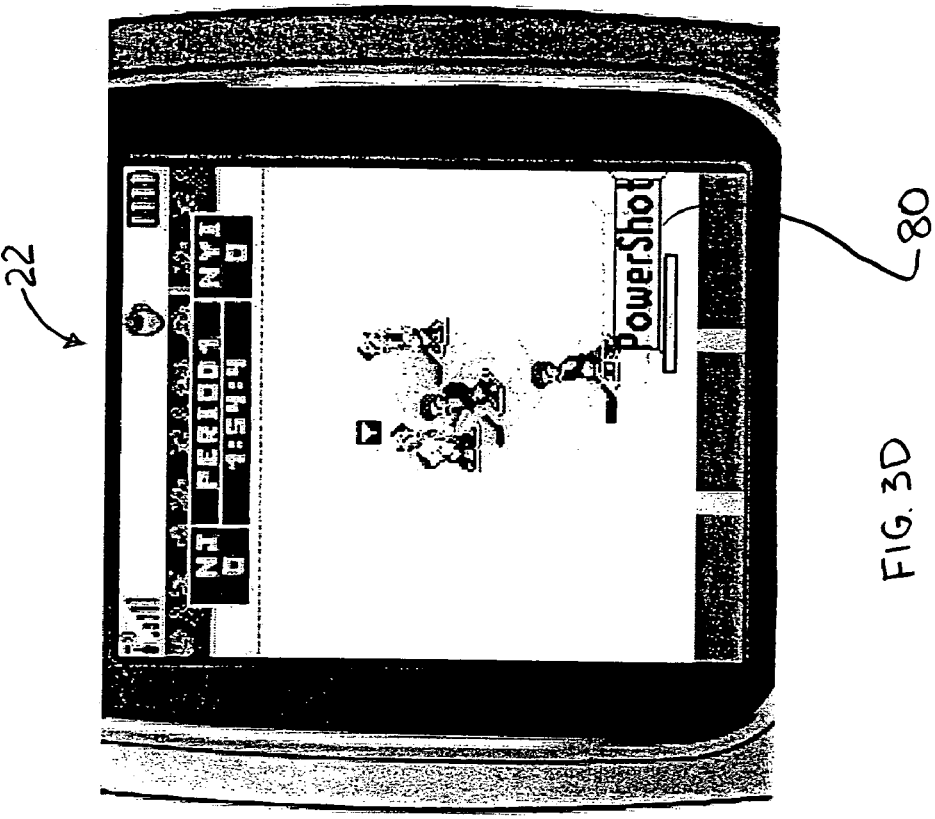
Figure 3C:
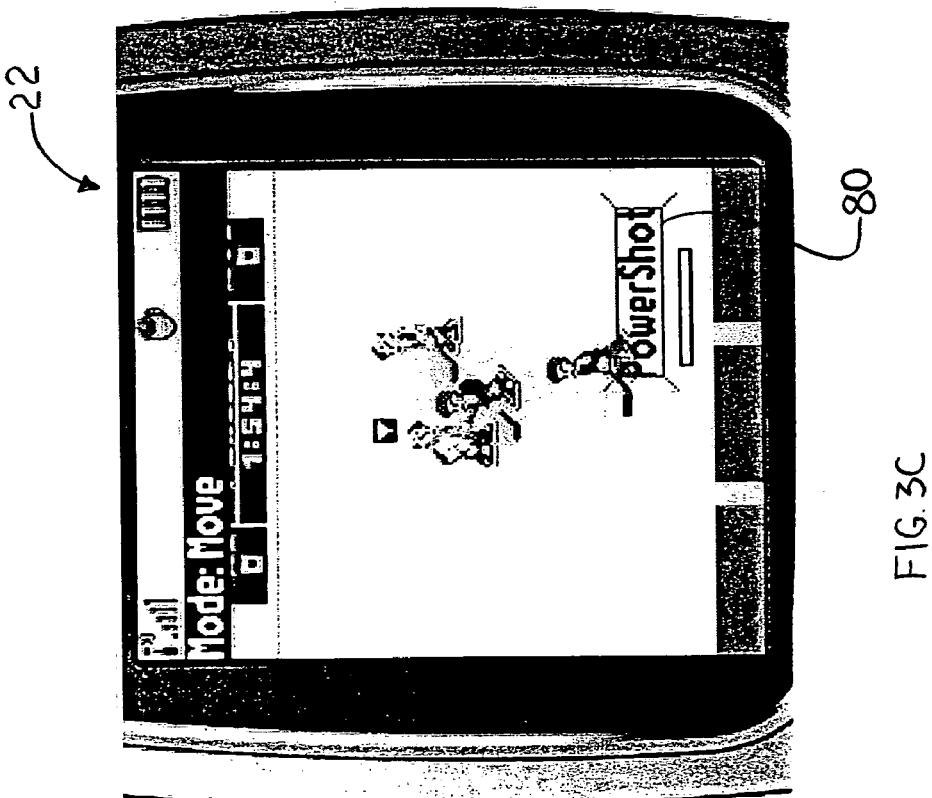
Figure 3F:
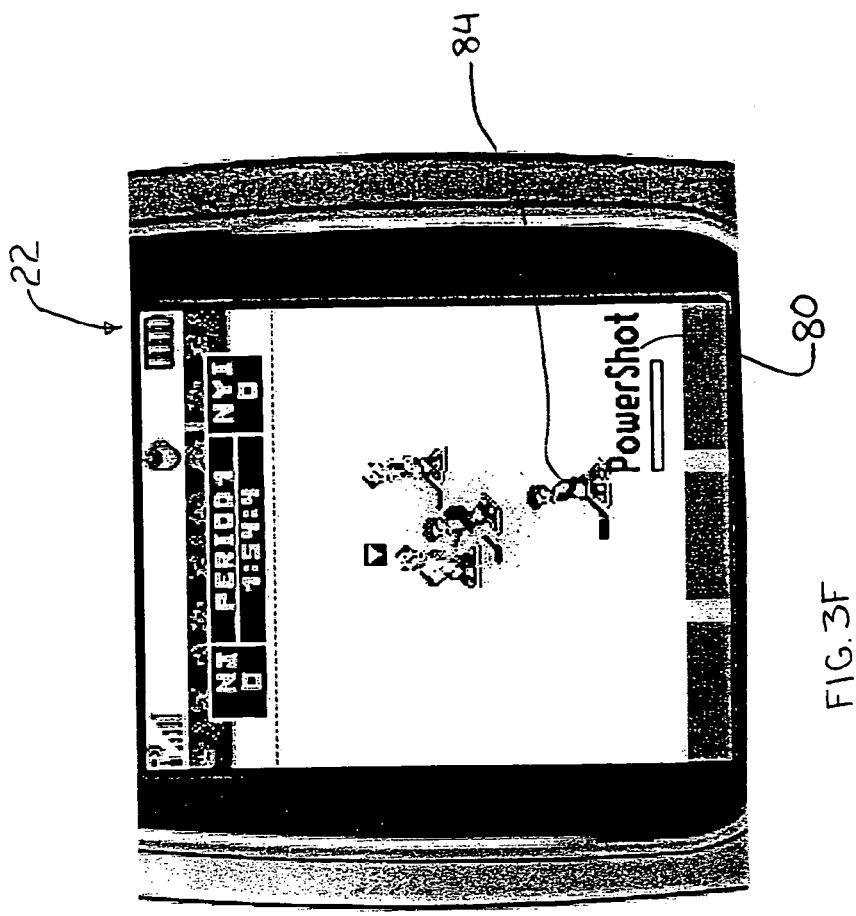
Figure 3E:

At step 62, the user is able to modify the highlighted graphics object 80 by input on the target mobile device 10, such as by pressing specially assigned keys on the keyboard 12. One example of such modification is moving the graphics object 80. As best shown in FIGS. 3C and 3D, the effect of the movement of the graphics object 80 is displayed by the GUI on the display 22, and the change to the source code is saved in the data structure 18. In the example shown in FIGS. 3A-3F, the change to the X and Y parameters of the graphics object 80 is saved. As best shown in FIG. 3E, the Info Mode can be used to display the changes to the X and Y parameter (shown in parentheses beside the original X and Y parameter values). FIG. 3F shows the modified position of the graphics object 80, where the "PowerShot" string has been moved so that it no longer overlaps with the hockey player object 84.

The user may then repeat step 62 as necessary to perform all needed modifications. When the user completes all of the modifications to all of the desired method calls in the desired frames, the operation moves to step 64 where the changes to the parameters saved in the data structure 18 are sent to a server (not shown) by invoking the network component 30. This operation may be commenced by pressing an assigned key on the keyboard 12.

At step 66, the server may then modify the application 14 by inserting the source code modifications contained in the file into the application 14. Preferably, the application 14 is modified using the system for modifying applications, as described in applicants' co-pending U.S. patent application Ser. No. 10/782,917, the entirety of which is incorporated by reference herein. Alternatively, the insertion of the changes into the application 14 may be made by available Java compilers.

The JAD/JAR (Java Application Descriptor/Java Archive) pair of the modified application may then be executed on the target mobile device and will provide improved graphics output.

The present invention provides the advantage of facilitating the modification of graphics output of applications by permitting the user to operate on source code in a runtime environment for the application, and to do so on an easy to use GUI.

While the present invention as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims.

The invention claimed is:

1. A method of modifying an application developed for a reference mobile device to optimize a graphics output of the application for a target mobile device having a display having different characteristics from the reference mobile device, the method comprising:
   a) loading the application on the target mobile device;
   b) executing at least a portion of the application on the target mobile device, wherein the graphics output of the portion of the application is displayed on the display of the target mobile device;
   c) storing at least one instruction from the application, wherein the at least one instruction comprises a method call and at least one parameter associated with the method call wherein the at least one instruction is adapted to produce the graphics output; and
   d) changing the at least one instruction by user input from the target mobile device;
   wherein the changing step is performed at runtime of the application;
   wherein the changing step is performed by changing a source code for the at least one instruction,
   wherein the changing step comprises changing one or both of the method call and the at least one parameter.

2. The method of claim 1, further comprising viewing the effect of the changing step on the graphics output to the display of the target mobile device.

3. The method of claim 2, wherein the viewing step further comprises:
   displaying the method call and the at least one parameter on the display of the target mobile device, and
   displaying the change to the at least one parameter on the display of the target mobile device.

4. The method of claim 3, wherein the viewing step is implemented using a GUI.

5. The method of claim 4, further comprising repeating steps (c) and (d) for a plurality of the instructions.

6. The method of claim 5, further comprising encoding the change to the at least one parameter into a network protocol.

7. The method of claim 6, wherein the network protocol comprises HTTP.

8. The method of claim 7, further comprising making the change to the at least one parameter of the at least one method call in a source code for the application and compiling the source code.

9. The method claim 8, wherein the Java application is a J2ME application.

10. The method of claim 9, wherein the method call is made from a J2ME Canvas class.

11. The method of claim 6, further comprising sending the change to a server.

12. The method of claim 11, wherein the application is a Java application.

13. The method of claim 12, wherein the method call comprises a method call to a J2ME graphics interface.

14. A method of modifying an application configured to produce a graphics output when executed on a computing device having a display, the method comprising:
   a) loading the application on the computing device;
   b) executing at least a portion of the application on the computing device, wherein the graphics output of the portion of the application is displayed on the display of the target mobile device;
   c) storing at least one instruction from the application, wherein the at least one instruction comprises a method call and at least one parameter associated with the method call, wherein the at least one instruction is adapted to produce the graphics output; and
   d) changing the at least one instruction by user input from the computing device;
   wherein the changing step is performed at runtime of the application;
   wherein the changing step is performed by changing a source code for the at least one instruction;
   wherein the changing step comprises changing one or both of the method call and the at least one parameter.

* * * * *